(12) United States Patent
Zhang et al.

(10) Patent No.: US 8,055,687 B2
(45) Date of Patent: Nov. 8, 2011

(54) SYSTEM AND METHOD FOR DETERMINING INTERVALS OF A SPACE FILLING CURVE IN A QUERY BOX

(75) Inventors: Bin Zhang, Fremont, CA (US); William K. Wilkinson, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 347 days.

(21) Appl. No.: 12/356,479

(22) Filed: Jan. 20, 2009

(65) Prior Publication Data

US 2010/0185692 A1 Jul. 22, 2010

(51) Int. Cl.
*G06F 17/30* (2006.01)
(52) U.S. Cl. .. 707/803; 707/759; 707/769; 707/E17.136
(58) Field of Classification Search .................. None
See application file for complete search history.

(56) References Cited

U.S. PATENT DOCUMENTS

| | | | |
|---|---|---|---|
| 6,326,964 B1 * | 12/2001 | Snyder et al. .................. 345/419 |
| 7,117,217 B2 * | 10/2006 | Ooi et al. .............................. 1/1 |
| 7,325,001 B2 * | 1/2008 | Goldstein et al. ...................... 1/1 |
| 2003/0004938 A1 * | 1/2003 | Lawder .............................. 707/3 |
| 2007/0237410 A1 * | 10/2007 | Cormode et al. ............. 382/240 |
| 2010/0082654 A1 * | 4/2010 | Zhang et al. .................. 707/759 |

* cited by examiner

*Primary Examiner* — Shyue Jiunn Hwa

(57) ABSTRACT

A system and method is disclosed for determining intervals of a space filling curve in a query box. The method includes the operation of providing a range query-box contained within a data set, wherein the data set has a plurality of elements in N dimensions. A space filling curve is applied to the data set. The space filling curve contacts each of the elements in the N dimensions. The space filling curve is also applied to a range-query box contained within the data set. An entry point of the space filling curve into the query box is determined. A first endpoint box is formed to cover an hquad of the space filling curve at the entry point that includes P×P elements, with a first value of P selected as one. The value of P is increased to expand the endpoint box around a next larger hquad of the space filling curve, until a size of the endpoint box is maximized without exiting the range-query box. The interval of the space filling curve in the endpoint box can then be determined.

20 Claims, 7 Drawing Sheets

SYSTEM AND METHOD FOR DETERMINING INTERVALS OF A SPACE FILLING CURVE IN A QUERY BOX

BACKGROUND

The amount of data stored in database systems has been continuously increasing over the last few decades. Most data sets have multiple attributes, referred to as being high dimensional. For example, it has become popular among retailers such as grocery stores to use incentive cards that offer discounts on purchases. Each incentive card is linked to a particular shopper. A database is created that tracks the shopper, the shopper's personal information, and the shopper's buying habits. The database may be arranged in columns and rows. A first column may include shopper names. Additional columns may include the associated shopper's age, address, phone number, and purchases. Each column can be referred to as a dimension. Such a database can easily include millions of data elements over several dimensions.

In order to obtain useful information from the database, programs have been created to search the database for particular information. For example, the types of purchases made by males ages 18-25 may be used to determine what type of food to stock before the Super Bowl.

A high dimensional data set takes a tabular form of rows and columns. Each row is a data item and each column is a dimension (or an attribute). A high dimensional data set is usually represented by a high dimensional discrete vector space, which can be mathematically represented by:

$$\Omega = D_1 \times D_2 \times \ldots \times D_n. \quad (1)$$

Each $D_i$ is a one-dimensional space, or column. The dimensionality of the data set is called n. In practice, a data set may contain additional columns, termed measures, that represent values for a point in high dimensional space, e.g., total sales, temperature, etc.

To enable searching of the database, an index to the data set $\Omega$ is constructed on a subset of columns, called the sorting key of $\Omega$. A sorting key can include all columns of $\Omega$. If more than one column is included in the sorting key, it is called a composite sorting key. A conventional index structure is a B-tree index, which orders the data set by the sorting key (or composite sorting key). The problem with a B-tree type index is that the ordering of the individual columns in the composite sorting key defines the kind of queries it is good for. The order of the columns in the composite sorting key defines the significance of the column in its influence on the sorting order. The order of two data items is determined by the most significant column in the index in which the attribute values of these two data items differ. Less significant columns in the composite sorting key have no influence on the order of these two data items.

For example, the database related to grocery shoppers may have a B-tree type index constructed based on name. However, this type of B-tree index is not useful if searching the database is based on the shopper's age. The solution has been to construct many secondary B-tree indices for different attributes in the database. However, the use of a large number of B-tree indices can take a large amount of storage space and can reduce the searching efficiency.

DETAILED DESCRIPTION OF EXAMPLE EMBODIMENTS

Reference will now be made to the exemplary embodiments illustrated, and specific language will be used herein to describe the same. It will nevertheless be understood that no limitation of the scope of the invention is thereby intended.

Creating an index of a database using a B-tree structure can require the construction of many secondary B-tree indices to enable a user to search for different attributes in the database. An indexing tree structure, called Universal B-tree (UB-tree), solves the problem of the B-tree structure by introducing a new sort order that does not significantly favor any column in the composite sorting key.

Such symmetry is introduced by using a space-filling curve to determine the sort order. A space-filling curve is a curve whose range contains the entire 2-dimensional square. In the case of a data set, the space-filling curve is a curve that passes through each element of the data set. A space filling curve is not limited to two dimensions. It can be used in any number of N dimensions. In the case of the index, the space filling curve travels through each element. An element is a space element, not necessarily a data point. Some elements have a data point in it, and some may not. The space filling curve travels through the elements in a predetermined manner, depending on the type of curve used. An index can then be built in the order in which the curve traverses the elements in the data space. This can eliminate the problem faced in the B-tree index by selecting a space filling curve that is not biased towards a particular row or column in the index.

Figure 1:
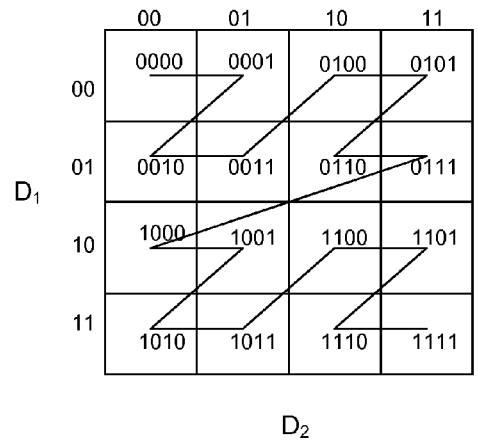
FIG. 1 is an illustration of a space filling curve in a 2-dimensional data space.

For example, FIG. 1 illustrates a space-filling curve called a Z-order curve. This particular space-filling curve is an exemplary demonstration and should not be construed as limiting. Other types of space filling curves that can be used, include, but are not limited to, Hilbert curves, Peano-Gosper curves, Dragon curves, Moore curves, and Sierpiński curves, and the like.

The space filling curve transforms the high dimensional space into a one-dimensional space. For example, with the Z-curve, the data items are ordered in the order of the z-curve, or z-order. Each data item will have a z-address. This address can be derived from its Cartesian address. A B-tree index can then be applied to the one-dimensional Z-addresses. The advantage of using a new z-ordering is the stronger locality of the data items in this ordering in the Cartesian space. This is shown in FIG. 1 for two dimensions, but the idea of the UB-tree (or space-filling curve) works for any high-dimensionality at least theoretically. Experimental results have shown that it can work well for up to 10 dimensions.

The space filling curve can have a hierarchical (recursive) hyperquadric shape. The hyperquad, referred to as an hquad, is a special shape that has its borders aligned with the boundaries of the binary subdivisions of the high dimensional space. The shape of the hquad is a square in two-dimensional space, a cube in three dimensional space, and so on. A two dimensional hquad is evenly divisible in half in both dimensions. Thus, as an hquad increases in size, it must increase in a way that makes it symmetric. This requires the hquad to double in size for each increased level, such as 1×1, 2×2, 4×4, 8×8, and so forth.

For example, an hquad may be formed as the top left square of FIG. 1, with an address of 0000. This is referred to in this application as a single element hquad. Each element can be represented by the variable P. A single element hquad has a size of P×P, where P has a value of one. When P is increased to two, the hquad increases in a way that makes it evenly divisible. In the example of FIG. 1, using a z-curve as the space filling curve, a 2×2 hquad is comprised of the top, left quadrant, including addresses 0000, 0001, 0010, and 0011. This also follows the z-curve and results in a z-address that is ordered. The next larger hquad consists of P=4, or all 16 squares. The z-address of those 16 squares is numbered in order in binary from 0 to 15. The translation between a two dimensional Cartesian address and a one dimensional z-address is discussed in more detail below.

Translation Between Cartesian Addresses and Z-Addresses

To prepare for the construction of a UB-tree, the common Cartesian coordinates of data have to be translated into Z-addresses—the position of the data along the Z-curve. In computer systems, data is typically represented in a binary number system; therefore, this translation may be best done in binary format. The translation is presented in the binary representation of the data in a computer system in this section. In practice, the translation may be accomplished on a server that is part of a server cluster containing a database.

Let the binary representation of a coordinate value for dimension $D_i$ be $$o_i = o_{i,0} o_{i,1} \ldots o_{i,s-1}, \tag{2}$$

where s is the number of bits, and 0 represents the most significant bit. For current computer systems, s most often takes a value of 8, 16, 32, or 64. But the same invention works for any value of s that may be taken in future computers. In experimentation performed on a UB-tree, s was set to be 32. For simplicity of presentation, we assume that the same s applies to all dimensions.

The Cartesian address of a data item in a data set $\Omega$ having n dimensions is written as $$o = (o_1, o_2, \ldots, o_n), \tag{3}$$

where the ordering of the n dimensions does not matter in principle, unlike a conventional B-tree, because of the way Z-addresses are constructed. The Z-address of this data item is defined by interleaving the bits of the component addresses in this vector:

$$z(o) = o_{1,0} o_{2,0} \ldots o_{n,0} o_{1,1} o_{2,1} \ldots o_{n,1} \ldots o_{1,s-1} o_{2,s-1} \ldots o_{n,s-1}. \tag{4}$$

The first bit in the Z-address is the first bit of the first dimension, the second bit in the Z-address is the first bit of the second dimension, and so on. When the first bit of the n-th dimension is merged into the Z-address, the next bit to be merged in the Z-address will be the second bit of the first dimension. The construction goes on in this rotation through the dimensions. This Z-address is used to sort the data in the data set. A conventional B-tree is then constructed on the sorted Z-addresses. The limitations of using a B-tree do not apply since the Z-addresses are listed in a single dimension. Therefore, a single index can be created to search the Z-addresses of the n dimensional data set $\Omega$.

In FIG. 1, if we write down the numbers in the boxes (in binary form) along the Z-curve, they occur in consecutive increasing order: 0000, 0001, 0010, 0011, 0100, 0101, 0110, 0111, 1000, 1001, 1010, 1011, 1100, 1101, 1111, with the binary address of the boxes in the columns and rows interleaved to form the address of each element along the z-curve.

Databases are often queried by specifying a range of the overall data set in each dimension to form a query box. The query box is a box that forms a subset of the total amount of information that a user is interested in. A query box may have an arbitrarily selected size and location within the main data space. When a space-filling curve, such as a z-curve, is used, it can be difficult to determine the z-address of data elements within the query box. One method is to follow the z-curve through the entire data set (scanning the whole data set and checking each element for containment in the query box). However, this can significantly reduce the speed of a search. In accordance with one embodiment of the present invention, a method has been developed to determine the addresses of elements along a space filling curve in a query box.

A B-tree, together with a new method of determining element addresses along the space filling curve in a query box, is called a Universal B-tree (UB-tree). Other than the range query method, UB-tree operations are nearly identical to the operations of the B-tree. Such operations include: insert, delete, node split, node merge, initial build of the tree, etc. All of these are identical to the B-tree operations except with a wrapping of a bidirectional address translation between Cartesian address and a space-filling curve address, such as a Z-address, so that the data exchange with other parts of the database is still done through conventional Cartesian coordinates (addresses).

Range Query and Z-Intervals

A range query is a retrieval of all data items in a given range-query box specified in Cartesian address by $$a_i \leq x_i \leq b_i, \quad i = 1, \ldots, n \tag{5}$$

Figure 2:
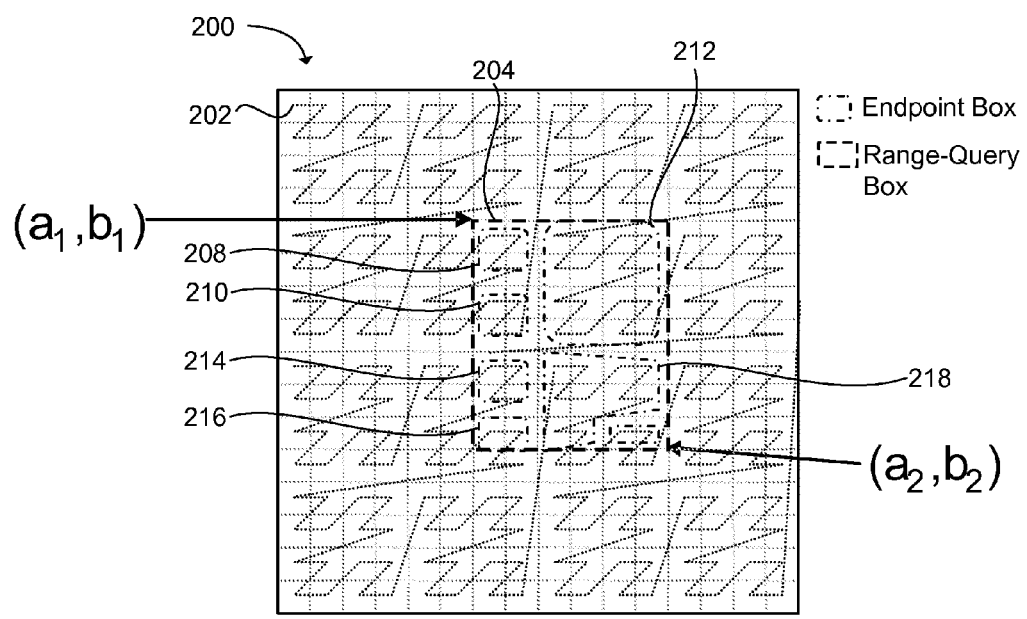
FIG. 2 is an illustration of a space filling curve in a data space with a range-query box contained within the space and endpoint boxes within the query box in accordance with an embodiment of the present invention.

In practice, a query need not specify a value range for each dimension. But, without loss of generality, we assume that each dimension is specified in the query box. Two points on the "main diagonal", $a = (a_1, a_2, \ldots, a_n)$ and $b = (b_1, b_2, \ldots, b_n)$, define the query box, which is a hyper-rectangular box in the n-dimensional space D. For example, FIG. 2 shows a portion of a two-dimensional data set 200 filled with a z-curve space-filling curve 202 and having a range-query box 204 within the data set, and point (a1,b1) of the range-query box located at the top left of the query box and point (a2,b2) at the bottom right side of the range-query box.

Complications of processing a range query come from the fact that data items are sorted by their Z-address and there is no simple alignment between a range of Z-addresses, a Z-address interval (Z-interval), and a query box in Cartesian coordinates. A Z-interval is a continuous range along the Z-curve, or in discrete coordinates, a consecutive set of points on the Z-curve. FIG. 2 illustrates one situation for two dimensions.

Since data is sorted by Z-address in a UB-tree, every node in the UB-tree, leaf or inner node, covers (or maps into) a Z-interval. UB-tree inner nodes contain a sequence of consecutive Z-intervals, where each Z-interval contains the Z-intervals in the corresponding child node. Leaves of the tree contain the individual Z-addresses of the data items.

Whether to search a sub-tree in the UB-tree is determined by the intersection between the query box and the Z-interval covered by the root of the sub-tree. If they intersect, the sub-tree has to be searched; otherwise, the sub-tree is pruned from the search. The intersection of the query box 204 with any Z-interval, if not empty, is a union of a sequence of disjoint Z-intervals, which is referred to as the maximum Z-interval contained in the query box because none of them can be extended without going out of the query box.

Range Query on UB-Tree

There is an advantage of knowing the beginning and the ending points of the maximum Z-intervals for processing a range query using UB-trees. Once known, all the data points between a begin point and an end point can be retrieved as output without checking them individually. Finding the beginning location and ending location in the UB-tree are two point-queries where the beginning location is given by the lower bounds of each dimension in the query and the ending location is given by the upper bounds. Point-queries are what a B-tree is especially good at, enabling such a query to be processed efficiently.

In accordance with one embodiment of the present invention, a method for determining the maximum interval of a space filling curve in a query box is disclosed. In order to efficiently find the maximum intervals of a space filling curve such as the z-curve shown in FIG. 2, the beginning and ending points of the maximum Z-intervals within the query box must be calculated quickly. It should be emphasized that the method covers the case that the end point of the Z-interval does not have to be the end point of a maximal Z-interval contained in the query box. It is often more efficient to get an end point value that covers more than half of a maximal Z-interval. The method can work correctly with a discovery of such a (non-maximal) end-point, and may even provide a better performance.

Figure 3:
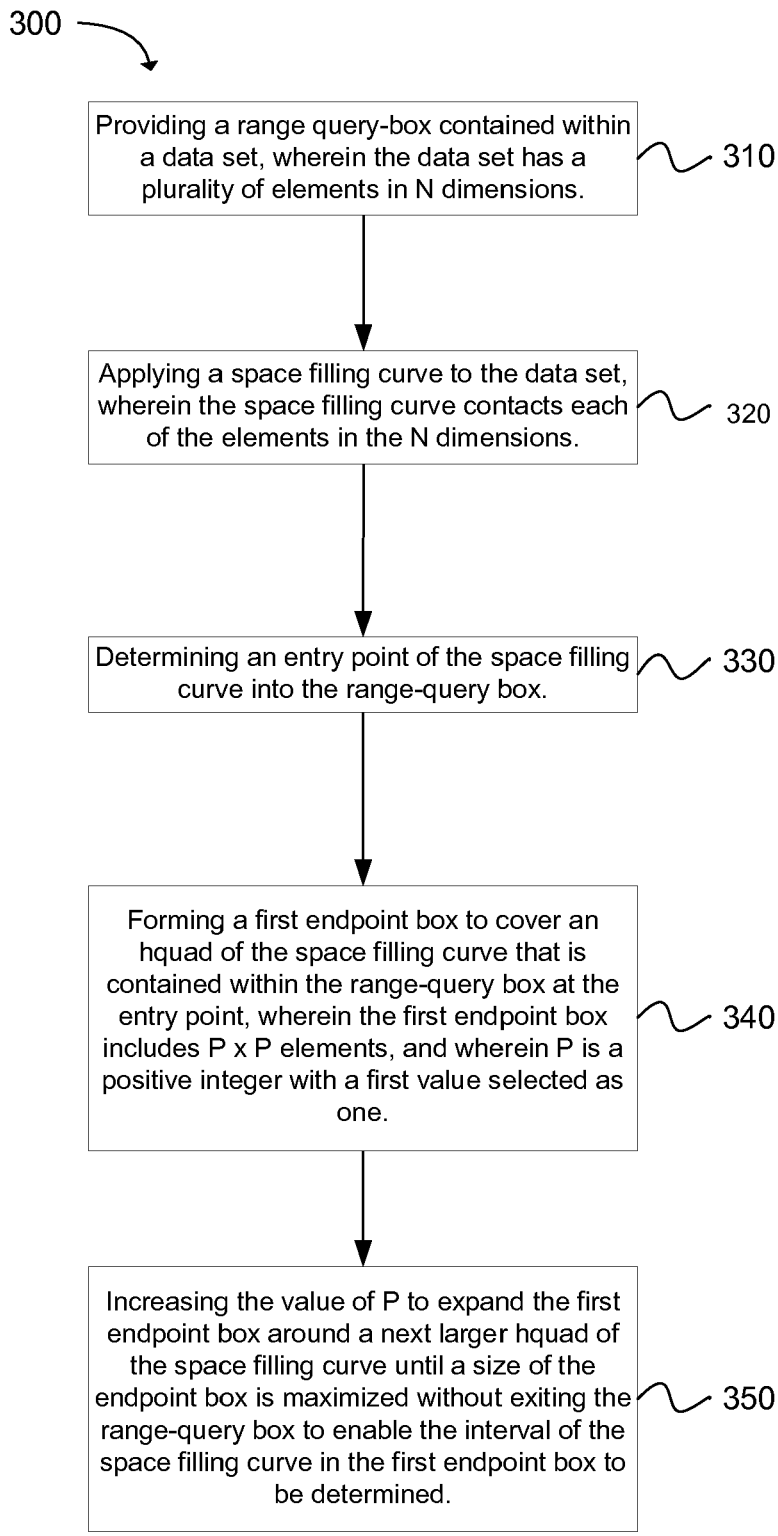
FIG. 3 is a flow chart depicting a method for determining a maximum interval of a space filling curve in a query box in accordance with an embodiment of the present invention.

In accordance with an embodiment of the present invention, a method 300 for determining an interval of a space filling curve in a query box is disclosed, as depicted in the flow chart of FIG. 3 and illustrated in the example shown in FIG. 2. The method includes the operation of providing 310 a range query box contained within a data space. The data set can have a plurality of elements in N dimensions. A high dimensional data set can take on a tabular form of rows and columns. Each row can be a data item and each column can be a dimension. A space filling curve can be applied 320 to the data set. The space filling curve can contact each of the elements in the N dimensions. An entry point of the space filling curve into the range-query box can be determined 330. In one embodiment, the entry point may be the top left corner of the range-query box.

The method further comprises the operation of forming 340 a first endpoint box to cover an hquad of the space filling curve that is contained within the range-query box at the entry point. An endpoint box is a term used to select the elements of a current z-interval. Endpoint boxes cannot overlap. The first endpoint box includes P×P elements (using the two dimensional example), wherein P is a positive integer with a first value selected as one. This creates an endpoint box within the range-query box having a single element. The value of P can then be increased 350 to expand the endpoint box around a next larger hquad of the space filling curve until the size of the endpoint is maximized without exiting the range-query box. This can enable the interval of the space filling curve from its entry point into the range-query to the curve's exit point from the first endpoint box to be determined. In one embodiment, each endpoint box can contain a maximum interval. The address of the first and last elements in the interval can then be used to access data on a computer readable medium, such as magnetic or optical rotatable storage media or a solid state storage medium.

If the space filling curve continues from the endpoint box and is still located within the range-query box, a next endpoint box can be formed having P×P elements, with a first value selected as one and a first element of the endpoint box beginning at the next element of the space filling curve located outside the first endpoint box. The value of P can again be increased to expand the next endpoint box around a larger hquad of the space filling curve until the endpoint box is maximized without exiting the range query box and the space filling curve has not exited the range-query box. This process can continue until the space filling curve exits the range-query box. This enables a starting point and an ending point address of the space filling curve located in the maximum interval located in the next endpoint boxes to be determined. The process of determining the maximum interval can continue as long as a non-zero sized hquad in the query box can be added to the interval.

The space filling curve may exit the range-query box and re-enter several times. When the curve does exit, a location of the next entry point of the space filling curve into the range-query box can be determined. The next maximal interval can be determined. The same process can then be continued of forming an additional endpoint box at the element at the entry point and increasing a size of the box to contain the largest hquad while keeping the endpoint box within the range-query box. If the curve exits the endpoint box while staying within the range-query box, then additional adjacent endpoint boxes can be added along the path of the space filling curve, as discussed above. This process can be continued until all of the elements within the range-query box are covered by endpoint boxes, thereby determining the starting and ending points of all of the segments of the space filling curve within the range-query box.

For example, returning to FIG. 2, the space-filling curve 202, in this example the z-curve, enters the range query box 204 at point (a1,b1). The z-address of this element in the data set 200 can be determined using equation (4). A 1×1 element endpoint box can be formed at the element (a1,b1) within the range query box. As seen in FIG. 2, the endpoint box can be increased in size from 1×1 to 2×2 to cover a larger hquad contained within the query box. Therefore, the endpoint box is increased in size to be 2×2. If the endpoint box were increased further to cover the next larger hquad (4×4), the endpoint box would extend outside the query box. Therefore, this endpoint box is as large as possible and the maximum interval of the space-filling curve in the range-query box is four elements. These elements will be contiguous along the space filling curve's address, such as a z-address when the space filling curve is a z-curve.

Since the elements are contiguous along the space filling curve's address, the address of each element in the segment is not needed. Rather, only the first and last addresses are needed, as previously discussed. This provides an advantage since it limits the number of addresses in the space filling curve that have to be translated to Cartesian coordinates. The first and last addresses can be translated and then be used to access data on the computer readable storage medium that corresponds with the elements between the first and last addresses. Larger endpoint boxes provide a greater increase in productivity. For example, with a 4×4 endpoint box, only two addresses are needed to obtain 16 data elements from the storage medium.

While the entire interval can typically be used to maximize productivity, there may be instances when an interval may be divided, with each sub-interval having separate first and last addresses. Additionally, an entire range of data between the first and last address of the interval may not always be present at or accessed from the storage medium.

The next entry of the space-filling curve 202 into the range query box 204 is at the element directly below the endpoint box 208. A new endpoint box can be formed, tested and expanded until it is found that a 2×2 endpoint box 210 is the largest that can be formed before the endpoint box exits the range-query box. The space-filling curve then re-enters the range-query box at a location to the right of the 2×2 box 208. At this location, an endpoint box can be formed, tested, and expanded until a 4×4 endpoint box 212 is formed covering an hquad. The space filling curve then exits the range-query box and enters at a location below the endpoint box 210. A 2×2 endpoint box 214 is then formed.

The space filling curve then exits endpoint box 214 and enters at the bottom left corner of the range-query box 204. A 1×1 endpoint box is formed. The endpoint box cannot be extended to be a 2×2 endpoint box without having the endpoint box go outside the bounds of the range-query box. Also, unlike in the previous endpoint boxes 208, 210, 212 and 214, the space filling curve 202 exits the 1×1 endpoint box, but does not exit the range-query box. Therefore, a next endpoint box can be formed in at the next element along the space filling curve. This endpoint box is also limited to a 1×1 element without exceeding the query box bounds. The space filling curve then exits the query box. These two adjacent endpoint boxes, that include a segment of the space filling curve that does not exit the range-query box, can be combined to form a 1×2 endpoint box 216.

The space filling curve 202 next enters the range-query box 204 and begins at an element below the endpoint box 212. At this point, a 1×1 endpoint box can be expanded to cover a 2×2 hquad. However, a 4×4 hquad will exceed the bounds of the query box. The space filling curve continues to stay within the bounds of the query box. Therefore, a next endpoint box is formed along the space filling curve at the next element. The next endpoint box can be expanded to also cover a 2×2 hquad. A next endpoint box is formed and tested as a 1×1 hquad, followed by an additional 1×1 hquad. These four endpoint boxes can be combined into a single endpoint box since the space filling curve does not exit the query box in the elements that they cover. This endpoint box is labeled 218.

The space filling curve 202 again exits the range-query box 204 and re-enters at a point below the endpoint box 218. Two 1×1 endpoint boxes are formed and combined to form endpoint box 220. At this point, all of the elements in the range-query box are included in seven endpoint boxes 208, 210, 212, 214, 216, 218 and 220. The seven segments of the space filling curve are the maximum segments of the space filling curve in the range-query box.

In another embodiment, an article of manufacture is disclosed that includes a computer usable medium having computer readable program code embodied therein for determining an interval of a space filling curve in a query box. The article of manufacture includes computer readable program code capable of performing the operations of described above and depicted in the flow chart of FIG. 3.

Figure 4:
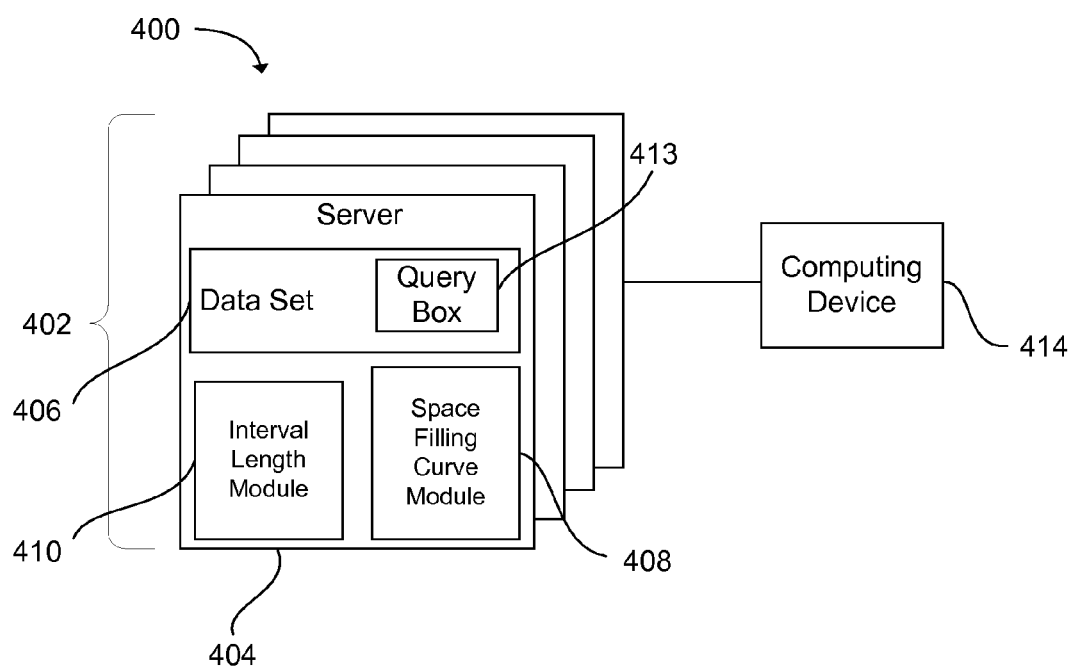
FIG. 4 is a block diagram illustrating a system for determining a maximum interval of a space filling curve in a query box in accordance with an embodiment of the present invention.

In another embodiment, a system for determining an interval of a space filling curve in a query box is disclosed. An illustration of one exemplary system is shown in FIG. 4. The system 400 can include a plurality of servers 402 configured to operate a database containing a data set. At least one server 404 of the plurality of servers can contain the data set 406. The data set can have a plurality of elements in N dimensions, as previously discussed.

The system 400 can also include a space filling curve module 408. The space filling curve module is operable on the at least one server 404 and configured to apply a space filling curve to the data set 406. The space filling curve contacts each of the elements in the N dimensions of the data set. The plurality of servers can be connected to a computing device 414 that is configured to enable a range-query box 413 contained within the data set to be selected. For example, a user may use a personal computer to perform a search. The computing device is configured to select a range-query box based on the user search parameters entered using the computing device. Alternatively, the computing device may be automated to select a range-query box without the need for user input. Any type of computing device capable of communicating a range-query box to the at least one server is considered to be within the scope of the invention.

The system 400 further includes an interval module 410 operable on at least one server 404. The interval module is configured to determine an entry point of the space filling curve into the range-query box 413. In one embodiment, the space filling curve can first enter the range-query box at a top, left corner of the range-query box, as shown in FIG. 2. Other entry points are also possible. The interval module is also configured to form an endpoint box to cover an hquad of the space filling curve (See FIG. 2). The endpoint box is used to determine an interval of the space filling curve in the query box. The endpoint box is contained within the range-query box. The endpoint box includes P by P elements, wherein P is a positive integer with a first value selected as one. In one embodiment, the value of P can double at each increased level.

The interval module 410 is configured to increase the value of P to form an endpoint box around a next larger hquad of the space filling curve until a size of the endpoint box is maximized without exiting the range-query box. The value of P will double with each increase when the space filling curve is a z-curve or a Hilbert curve. The actual amount of increase in the value of P is dependent on the type of space filling curve used. Finding the maximum hquad size of the endpoint box enables the maximum interval of the space filling curve in the first endpoint box to be determined. The address of the space filling curve can also be determined. The addresses along the space filling curve can be consecutive. For example, when a z-curve is used, as in FIG. 2, the z-address of the space filling curve within the endpoint box can be consecutive.

When the space filling curve does not exit the range-query box, the space filling curve module 408 can be further configured to form a next endpoint box having P×P elements, with P initially set to a value of one. The 1×1 endpoint box can be located at a next element of the space filling curve after the previous endpoint box. The interval module 410 is configured to increase (double for z-curve and Hilbert curve) the value of P to form the next endpoint box around a next larger hquad of the space filling curve until the size of the next endpoint box is maximized without exiting the range-query box and the space filling curve has not exited the range-query box. The first endpoint box and the next endpoint boxes can be combined over the space filling curve within the range-query box.

Exemplary Software Program

One exemplary bit-wise process for obtaining the end point of a maximum Z-interval is given in the following computer readable program code. This example is not intended to be limiting. Other processes for determining a maximal interval of a space filling curve in a query box are also considered to be within the scope of the present invention.

```
void zCmpGNZE ( int dim, zword *pt, zword *qblo, zword *qbhi,
        long *flag,
        long *minOutStep, // the step causing the point to go out
        long *minDim,      // the dimension of the minOutStep
        long *lastOne,
        long *lastZero,    // the last zero position of each dim
        long *saveMin,     // saveMin position of the each dim
        long *saveMax )    // saveMax position of the each dim
{
    long    d, s;
    long    *f, *lastop, *lastzp, *minp, *maxp;
    long    maxStep = WDSZ;
    long    wbp;
    unsigned int lobit, hibit, ptbit;
    long    minStep = −1;
    long    minD = −2;
    long    needMin, needMax;
    zword *lop, *hip, *ptp;
    zword mask;
    f = flag;
    lastop = lastOne;
    lastzp = lastZero;
    minp = saveMin;
    maxp = saveMax;
    for(d=0; d<dim; d++, f++, lastop++, lastzp++, minp++, maxp++) {
        // working with one dim at a time
        needMin = needMax = 1;
        *lastop = −1;
        *lastzp = −1;
        *minp = maxStep;
        *maxp = maxStep;
        lop = qblo; hip = qbhi; ptp = pt;
        wbp = d;
        for(s=0;s<maxStep;s++) {
            if ( wbp >= WDSZ ) {
                wbp −= WDSZ;
                lop++; hip++; ptp++;
            }
            mask = wbp2mask(wbp);
            lobit = (*lop) & mask;
            hibit = (*hip) & mask;
            ptbit = (*ptp) & mask;
            if ( (ptbit > lobit) && needMin )
                *minp = s; needMin = 0;
            else if ( (ptbit < hibit) && needMax )
                    *maxp = s; needMax = 0;
            if ( (lobit > 0) ) *lastop = s;
            if ( (hibit == 0) ) *lastzp = s;
            wbp += dim;
        }
        if (*lastop < *minp)
            if (minStep <= *lastop) { minStep = *lastop; minD = d; }
        else
            if (minStep <= *minp) { minStep = *minp; minD = d; }
        if (*lastzp < *maxp) {
            *f = 0;
            if (minStep <= *lastzp) { minStep = *lastzp; minD = d; }
        } else {
            *f = 1;
            if (minStep <= *maxp) { minStep = *maxp; minD = d; }
        }
    }
    *minOutStep = minStep;
    *minDim = minD;
    return;
} // zCmpGNZE
int getNextZE ( int dim, zword *pt, zword *qblo, zword *qbhi )
{
    long flag[ZMAXDIM];
    long lastOne[ZMAXDIM];
    long lastZero[ZMAXDIM];
    long saveMin[ZMAXDIM];
    long saveMax[ZMAXDIM];
    int j, d;
    long minOutStep;
    long minD;
    zCmpGNZE ( dim, pt, qblo, qbhi, flag, &minOutStep, &minD,
            lastOne, lastZero, saveMin, saveMax );
    if (flag[minD]) {
        j = dimStep2zbp(minD, saveMax[minD], dim);
        zbpSet(pt, j);
        d = minD+1;
        j++;
        for (; j < zbpMax(dim);d++, j++) {
            if (d >= dim) d −= dim;
            if (d != minD || zbpGet(qbhi, j))
                zbpSet(pt, j);
            else
                zbpClear(pt, j);
        }
    } else {
        for (j = dimStep2zbp(minD, minOutStep, dim) + 1; j < zbpMax(dim); j++)
            zbpSet(pt, j);
    }
    return 0;
} // getNextZE
```

Explanation of Bit-Wise Process

Given a range query box Qbox and a given point pt in the Qbox, the Z-interval is extended starting from pt to the boundary of the Qbox. This results in a maximal Z-interval starting from pt and still contained in the Qbox.

In one embodiment, finding the maximal z-interval can be done by extending the Z-interval one "hquad" at a time. An "hquad" is a special shape (square in 2D, cube in 3D and so on) with its borders aligned with the boundaries of the binary subdivisions of the high dimensional space (as illustrated in FIG. 2, with the 1×1, 2×2, and 4×4 hquads illustrated.)

The process is comprised of two phases: (1) An information collection phase, which is done by the function zCmpGNZE( ) in the code; and (2) An end-point construction phase, which is in the function getNextZE( ) in the code. In the EndPoint process, the Z-addresses are worked with directly. However, it is important to keep track of which dimension each bit in the Z-address belongs to. Following formula (4), tracking is not difficult because the dimension of a bit in a Z-address rotates from 1 to n (where n=dim in the code). The index d in the outer for-loop of the code keeps track of the dimension. It is also important to notice that the whole Z-address can be divided into sections called "steps". Steps are indexed by s in the code. Formula (4) is copied here to show the dimensions and the steps in a Z-address:

$$Z(O) = \underbrace{O_{1,0}O_{2,0} \ldots O_{n,0}}_{\text{Step 1}} \underbrace{O_{1,1}O_{2,1} \ldots O_{n,1}}_{\text{Step 2}} \ldots \underbrace{O_{1,s-1}O_{2,s-1} \ldots O_{n,s-1}}_{\text{Step s}}$$

Inside each step, the dimension goes from 1 to n. By combining the two indices d and s, we are able to traverse through all the bits in a Z-address, and determine which dimension each bit belongs to.

Several functions for describing the bit-wise process are described below.

Function j=dimStepzpt(current_dim, current_step, n) is defined to help find the position of the bit in a Z-address that belongs to the dimension current_dim and in the step current_step. The position of the bit is returned from the function as j.

Function zbpSet(pt, j) sets the bit at position j in the Z-address pt to 1.

Function zbpClear(pt, j) clears the bit at position j in the Z-address pt to 0.

Function zbpGet(pt, j) checks the value of the bit at position j in the Z-address pt. It returns the value (as 0 or 1).

With these helping functions, the EndPoint algorithm can be described.

The input to the EndPoint algorithm has three inputs: (1) Total dimensionality: n (or dim in the code); (2) A point pt in the Qbox; and (3) Qbox: including the QueryBoxLow, which is illustrated by the point (a1, b1) in FIG. 2, and QueryBoxHigh, which is illustrated by the point (a2, b2) in FIG. 2.

Phase 1 of the algorithm collects information from the inputs (1, 2, 3 above). Function zCmpGNZE( ) in the code is for collecting the information. The collected information is stored in the following variables:
flags[n] for each dimension: remember the particular case that determines the value of the following two variables, minOutStep and minDim;
minOutStep: the step in which the Z-curve goes out of the Qbox;
minDim: the dimension in which the Z-curve goes out of the Qbox;
lastOne[n]: tracking the position of the least significant "1" bit in each dimension;
lastZero[n]: tracking the position of the least significant "0" bit in each dimension;
SaveMin[n]: tracking if condition pt>QueryBoxLow is guaranteed for each dimension; and
SaveMax[n]: tracking if condition pt<QueryBoxHigh is guaranteed for each dimension.

An information collection phase, zCmpGNZE( ) is accomplished in the code as follows. Each dimension starting from d=1 until d=n (or dim) is traversed. The processing steps phase comprises working with the current dimension by going through each bit in the dimension one-by-one from the most significant bit to the least significant bit (left to right in the formula for z(o) above).

The guarantees (saveMin, saveMax) are searched as follows:
a) Comparing the bits, which are named lobit, hibit, and ptbit in the code, from the three Z-addresses QueryBoxLow, QueryBoxHigh and pt at position j;
b) If ptbit>lobit (which means that ptbit=1 and lobit=0), we have found the guarantee bit for the Z-curve not going out of the Qbox from the low side in the current dimension. The step of this bit position is stored in minp (minp=s in the code);
c) If ptbit<hibit, the guarantee bit for the Z-curve not going out of the Qbox from the high side in the current dimension has been found. The step of this bit position is stored in maxp (maxp=s in the code);
d) if lobit>0, then it is recorded that last "1" bit in QueryBoxLow is not earlier than the current step.
e) if hibit==0, then it is recorded that the last "0" bit in QueryBoxHigh is not earlier than the current step.

Steps a) through e) are repeated until saveMin, saveMax, lastOne, and LastZero are all found for the current dimension. After collecting these four pieces of information for the current dimension, the indicators minStep and maxStep are updated as follows based on the information collected for the current dimension.

If the last "1" in QueryBoxLow in the current dimension happened no later than (to the left) the earliest bit that guarantees pt>QueryBoxLow, which is the bit at minp (and the current dimension), and the minStep found so far through all the earlier dimensions are to the left of the position of the variable value last "1" in QueryBoxLow, then minStep is updated to be equal to the position of the last "1" in this dimension. The value of the current dimension as is recorded as minD. The flag is set to 0.

Similarly, if the last "0" in QueryBoxHigh in the current dimension happens no later than the earliest bit that guarantees that pt<QueryBoxHigh, which is the bit at maxp (and the current dimension), and the minStep variable found so far through all the earlier dimensions are to the left of the position of last "0" in QueryBoxHigh, the minStep is updated to be equal to the position of the last "0" in this dimension. The current dimension is recalled as minDim and the flag is set for this dimension to 0. If the minStep found so far through all the earlier dimensions are to the right of the position of the last "0", but no later than the earliest bit that guarantees pt<QueryBoxHigh, which is the bit at maxp, then the minStep value is updated to be equal to the position of the bit that guarantees that pt<QueryBoxHigh. It is also recalled that the current dimension is minDim and the flag is set for this dimension to 1.

At this point, the process is completed for the current dimension. The process reverts to the processing steps phase to do the same for the next dimension until all dimensions are completed. This concludes the information collection phase. The following information is collected: Flags[n], minOutStep, minDim, LastOne[n], LastZero[n], SaveMin[n], and SaveMax[n].

These quantities are used in the construction phase, which is described in one embodiment as follows. The second phase in the EndPoint algorithm is shown in the function getNextZE( ). The purpose of the second phase is to construct the Z-address of the EndPoint. The construction starts from the given point pt by modifying its bits at certain locations.

Depending on the flag set in the information phase, one of the following processes occurs: (1) If the value of the flag on the minDim dimension is set to 1, then the bit of the point pt at the saveMax[minD] step and in dimension minDim is set to a value of 1. All the tailing bits (bits to the right) of dimension minDim are set to 0. All of the tailing bits of other dimensions are set to the value of the QueryBoxHigh. If the flag on the minDim dimension is set to a value of 0, then all the bits to the right of the bit at dimension minDim and Step minOutStep are set to 1. This completes the process of determining all of the intervals of the space filling curve in the query box.

Experimental Evaluation

The exemplary bit-wise process for obtaining the end point of a maximum z-interval in a range query box was evaluated against a randomly generated data base as well as a real-life database. On a ten-dimensional synthetic data set with 10 million rows of random data, indices were created of dimensions varying from n=4 to n=10. Three kinds of indices were created for each dimension: (a) a UB-tree of dimension n; (b) a B-tree of dimension n; and c) n B-trees of dimension 1.

In the evaluation, 5000 randomly generated range queries were run using each kind of index. The performance measurements from index (a) was compared with the two performance measurements from indices (b) and (c). The results for the time returned for index (b) relative to the time returned for index (a) for N=8 and N=10 are plotted and illustrated in FIGS. 5a and 5b. The log plots illustrated in FIG. 5a are for N=8 and the plots in FIG. 5b are for N=10.

The plots 502-520 show the search times using the UB-tree were generally faster than using a B-tree of dimension n. As the number of queries increased, the searching speed using the UB-tree increased exponentially, often to speeds over 1000 times faster than when using the B-tree. The results for index (a) relative to index (c) were similar. The plots show results for different selectivity, wherein the search returned results. Plot 502 shows the results for zero search results returned. Plot 504 shows between 1 and 10 results returned. Plot 506 shows between 10 and 100 results returned. Plot 508 shows between 100 and 1,000 results returned. And plot 510 shows between 1,000 and 10,000 results returned. The plots show that the UB-tree search offered the highest levels of performance relative to a B-tree search when fewer results are returned. However, even when a large number of results are returned, the UB-tree search typically has a 10 to over 100 times increase in speed.

Figure 5A:
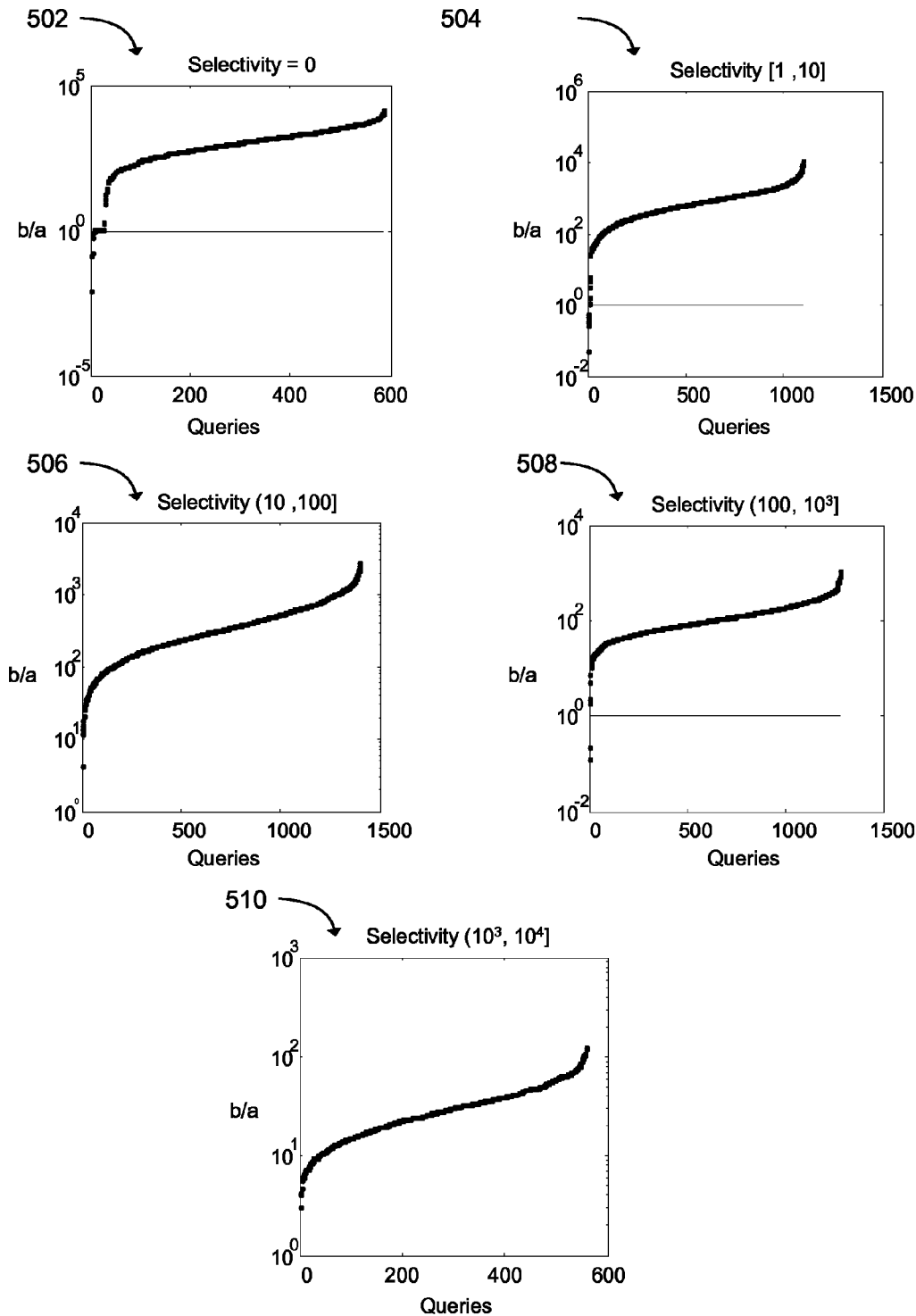
FIG. 5a shows timing plots of a UB-tree search in 8 dimensions relative to a B-tree search in accordance with an embodiment of the present invention.
Figure 5B:
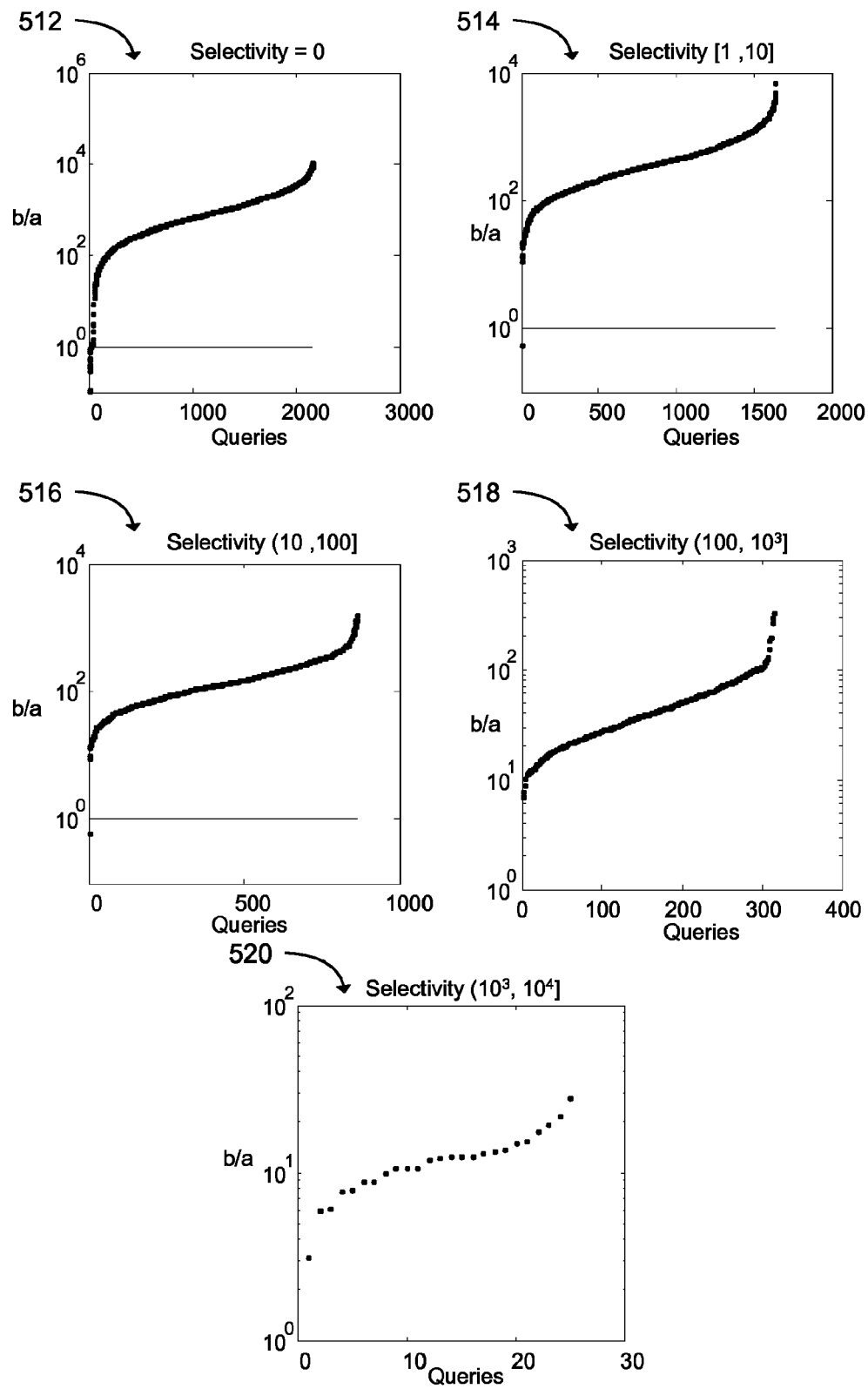
FIG. 5b shows timing plots of a UB-tree search in 10 dimensions relative to a B-tree search in accordance with an embodiment of the present invention.

Similar results are shown in FIG. 5*b* for a value of N=10 in plots 512-520. While the performance level isn't quite as great for N=8, there is still a significant advantage of using the UB-tree in the search.

Experimental results on real-world data sets showed consistent results with the plots in FIGS. 5*a* and 5*b*. Using actual data from an e-commerce web site, the performance of a UB-tree was compared against multiple B-tree indexes using random range queries. On the vast majority of queries, the UB-tree search process out-performs the B-tree processes by a wide margin, often by 10×-100×.

The data set in the e-commerce site comprises about 4 million rows, where each row describes one customer order and includes the shipping location (latitude, longitude), order date and time, shipping data and time, invoice date and time, order total, and shipping total. A random query generator selected a shipping destination by choosing a U.S. city and a radius around that city. Restrictions on the other dimensions were randomly generated within the value range for that dimension. A 4-dimensional UB-tree was created. Its performance was compared to four 1-dimensional B-trees on 1000 random queries over the four dimensions. This step was repeated for six and eight dimensions.

Figure 6A:
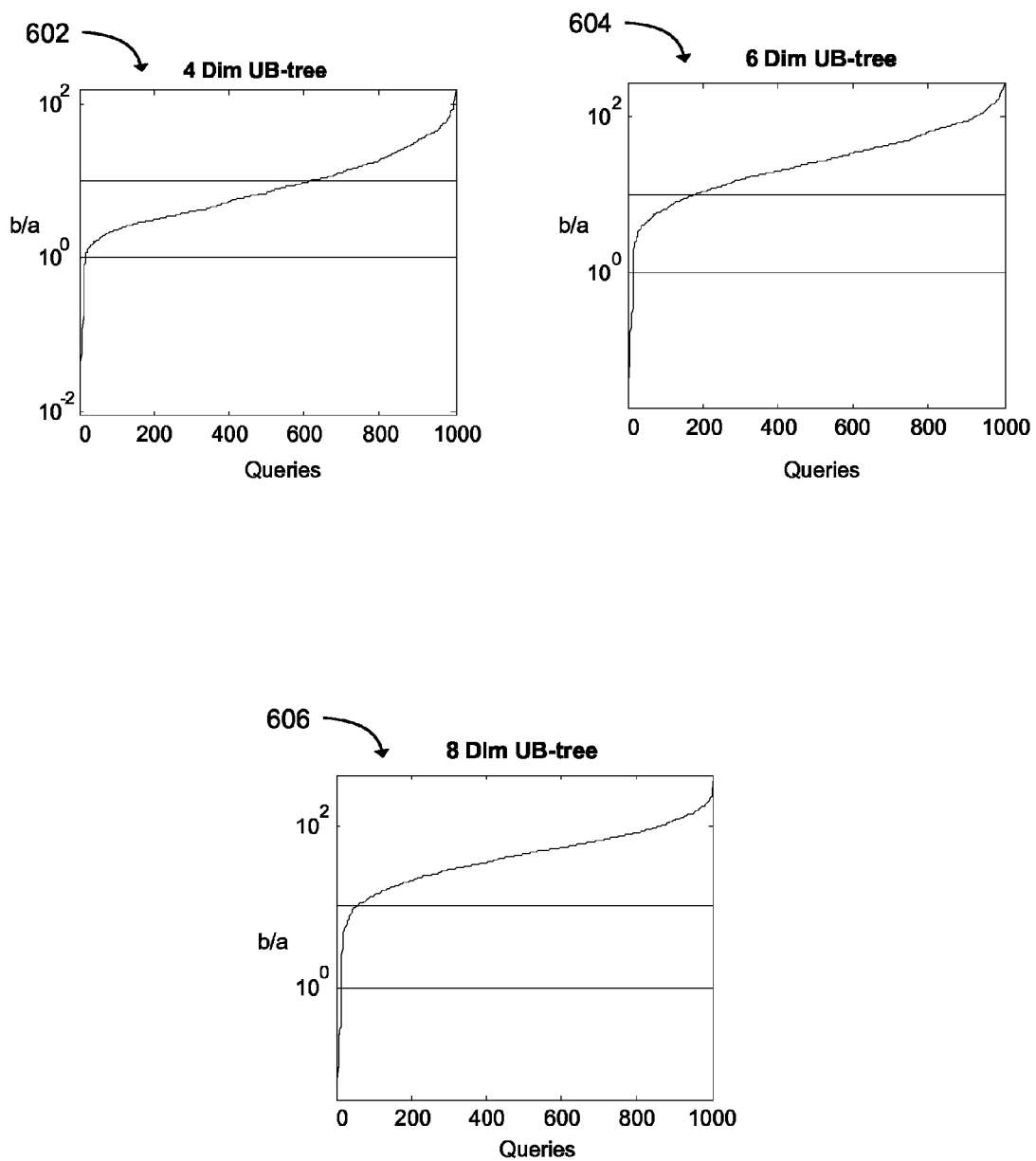
FIG. 6a shows timing plots of a UB tree search relative to a B-tree search conducted on a real-world database in accordance with an embodiment of the present invention.

The 4D queries were less selective (i.e., returned more rows) than the 6D queries which, in turn, were less selective than the 8D queries. The UB-tree out-performs the B-tree in each case and the performance difference grows with higher dimensionality. The plots illustrated in FIG. 6*a* show the (sorted) ratio of response times for 1000 random queries of different dimensionality. In the plot, the log of the ratio is shown. For example, in the 4 dimension case, the UB-tree out-performs the B-tree for all but a few queries (where the ratio is less than one). The UB-tree is more than 10 times faster then B-tree for 40 percent of the queries. The results for higher dimensions are even better.

In examining the query plans for high-dimensional B-tree queries, it was discovered that all possible B-tree indexes were not always used for a query. For example, for an 8D query, only four B-trees may be used rather all eight. If a query constraint on a column is not very selective, it makes no sense to use a B-tree for that column; a serial scan is more efficient. However, in the case of a UB-tree, the less selective constraints can be used in conjunction with more selective constraints on other columns. Consequently, the UB-tree is more effective.

Figure 6B:
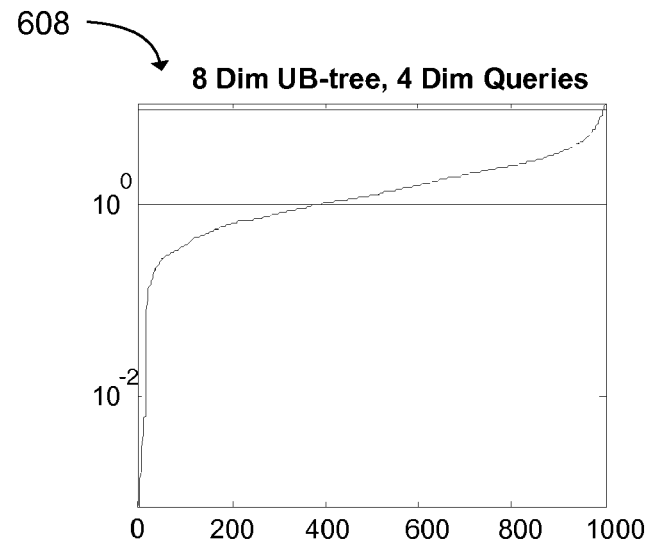
FIG. 6b shows timing plots of a UB tree search relative to a B-tree search conducted on a real-world database in accordance with an embodiment of the present invention.
Figure 6B:
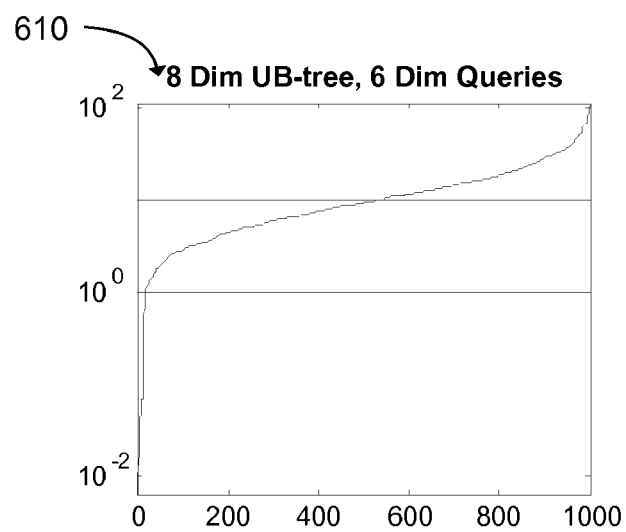

Of course, the effectiveness of the UB-tree depends on the query mix. An 8D UB-tree is not needed if most queries constrain only one dimension. So, experiments were conducted to determine the effectiveness of a UB-tree when queries do not constrain all dimensions. FIG. 6*b* shows the results of querying an 8D UB-tree with 4-dimensional and 6-dimensional queries. The plots show a B-tree of dimension 4 relative to a UB-tree, and a B-tree of dimension 6 relative to a UB-tree, respectively. For 6D queries, the UB-tree still out-performs the B-tree in most cases. For 4D queries, B-trees are faster for almost half of the queries. Consequently, it cannot be expected that a single, large dimensional UB-tree can be used as a replacement for all indexes for all query mixes. However, the graphs show that for most databases, especially those of higher dimension, where the searches are also higher dimensional, the use off a UB-tree can provide a significant decrease in the time it takes to perform a search such as a query in a database.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A computer implemented method for determining an interval of a space filling curve in a query box, comprising:
   providing a range query-box contained within a data set, wherein the data set has a plurality of elements in N dimensions;
   applying a space filling curve to the data set, wherein the space filling curve contacts each of the elements in the N dimensions;
   determining an entry point of the space filling curve into the range-query box;
   forming a first endpoint box to cover an hquad (hyperquad) of the space filling curve that is contained within the range-query box at the entry point, wherein the first endpoint box includes P×P elements, and wherein P is a positive integer with a first value selected as one; and
   increasing the value of P to expand the first endpoint box around a next larger hquad of the space filling curve until a size of the first endpoint box is maximized without exiting the range-query box to enable the interval of the space filling curve in the first endpoint box to be determined.

2. A method as in claim 1, further comprising:
   forming a next endpoint box having P×P elements, with the first value selected as one and a first element of the endpoint box that begins at a next element of the space filling curve, if the space filling curve has not exited the range-query box; and
   increasing the value of P to expand the next endpoint box around a next larger hquad of the space filling curve until a size of the next endpoint box is maximized without exiting the range-query box and the space filling curve has not exited the range-query box to enable the interval of the space filling curve in the next endpoint boxes to be determined.

3. A method as in claim 1, further comprising:
   determining a next entry point of the space filling curve into the range-query box that occurs after the space filling curve exits the range-query box;
   forming the first endpoint box to cover an hquad of the space filling curve at the entry point that is contained within the range-query box, wherein the endpoint box includes the P×P elements, with a first value selected as one;
   increasing the value of P to expand the first endpoint box around a next larger hquad of the space filling curve until a size of the first endpoint box is maximized without exiting the range-query box;
   forming the next endpoint box having P×P elements, with the first value selected as one and the first element of the endpoint box that begins at the next element of the space filling curve, if the space filling curve has not exited the range-query box; and increasing the value of P to expand the next endpoint box around the next larger hquad of the space filling curve until a size of the endpoint box is maximized without exiting the range-query box and the space filling curve has not exited the range-query box to enable the interval of the space filling curve from the next entry point to an exit point to be determined.

4. A method as in claim 3, further comprising determining a start address and a stop address for each interval of the space filling curve in the first and the next endpoint boxes.

5. A method as in claim 4, further comprising accessing data on a computer readable storage medium having an address that corresponds to data from the start address to the stop address for each of the intervals of the space filling curve in the first and the next endpoint boxes.

6. A method as in claim 4, further comprising accessing a portion of the data on a computer readable storage medium having an address that corresponds with data from the start address to the stop address for at least one interval of the space filling curve in the first and the next endpoint boxes.

7. A method as in claim 4, further comprising dividing the interval of the space filling curve to form at least a first sub-interval and a second sub-interval and accessing data on a computer readable storage medium that corresponds to the addresses between the first and last addresses of the first and second sub intervals.

8. A method as in claim 1, wherein applying the space filling curve further comprises applying a space filling curve selected from the group consisting of a z-order curve, a Hilbert curve, a Peano-Gosper curve, a Dragon curve, a Moore curve, and a Sierpiński curve.

9. A method as in claim 2, further comprising combining the first endpoint box and the next endpoint boxes to form a single endpoint box when the space filling curve does not exit the range-query box between the first and next endpoint boxes.

10. A system for determining an interval of a space filling curve in a query box, comprising:
a computing device containing a data set having a plurality of elements in N dimensions;
a space filling curve module operable on the computing device and configured to apply a space filling curve to the data set, wherein the space filling curve contacts each of the elements in the N dimensions;
the computing device operable to enable a range-query box contained within the data set to be selected;
an interval module operable on the computing device and configured to determine an entry point of the space filling curve into the range-query box;
the interval module further configured to form an endpoint box to cover an hquad (hyperquad) of the space filling curve that is contained within the range-query box at the entry point, wherein the endpoint box includes P×P elements, and wherein P is a positive integer with a first value selected as one; and
the interval module further configured to increase the value of P to form an endpoint box around a next larger hquad of the space filling curve until a size of the endpoint box is maximized without exiting the range-query box to determine the interval of the space filling curve in the first endpoint box.

11. A system as in claim 10, further comprising:
the space filling curve module further configured to form a next endpoint box having P×P elements, with a first value of P selected as one and a first element of the endpoint box that begins at a next element of the space filling curve, if the space filling curve has not exited the range-query box; and
the interval module configured to increase the value of P to form the next endpoint box around a next larger hquad of the space filling curve until a size of the next endpoint box is maximized without exiting the range-query box and the space filling curve has not exited the range-query box to enable the interval of the space filling curve in the next endpoint boxes to be determined.

12. A system as in claim 10, further comprising:
the space filling curve module operable to determine a next entry point of the space filling curve into the range-query box that occurs after the space filling curve exits the endpoint box and the range-query box;
the interval module configured to form an additional endpoint box to cover an hquad of the space filling curve at the entry point that is contained within the range-query box, wherein the endpoint box includes the P×P elements, with a first value selected as one;
the interval module further configured to increase the value of P to form an endpoint box around a next larger hquad of the space filling curve until a size of the endpoint box is maximized without exiting the range-query box;
the interval module configured to form the next endpoint box having P×P elements, with the first value of P selected as one and the first element of the endpoint box that begins at the next element of the space filling curve, if the space filling curve has not exited the range-query box; and
the interval module configured to increase the value of P to form the next endpoint box around the next larger hquad of the space filling curve until a size of the endpoint box is maximized without exiting the range-query box and the space filling curve has not exited the range-query box to determine the interval of the space filling curve from the next entry point to an exit point.

13. An article of manufacture including a non-transitory computer storage medium having computer readable program code stored thereon for determining an interval of a space filling curve in a query box, comprising computer readable program code capable of performing the operations of:
providing a range-query box contained within a data set, wherein the data set has a plurality of elements in N dimensions;
providing a range-query box contained within the data set;
applying a space filling curve to the data set, wherein the space filling curve contacts each of the elements in the N dimensions;
determining an entry point of the space filling curve into the range-query box;
forming a first endpoint box to cover an hquad (hyperquad) of the space filling curve that is contained within the range-query box at the entry point, wherein the endpoint box includes P×P elements, and wherein P is a positive integer with a first value selected as one;
determining if the space filling curve exits the endpoint box and the range-query box at the current value of P; and
increasing the value of P to expand the first endpoint box around a next larger hquad of the space filling curve until a size of the endpoint box is maximized without exiting the range-query box to enable an interval of the space filling curve in the first endpoint box to be determined.

14. The article of manufacture of claim 13, further comprising computer readable program code capable of performing the operations of:

forming a next endpoint box having P×P elements, with a first value of P selected as one and a first element of the endpoint box that begins at a next element of the space filling curve, if the space filling curve has not exited the range-query box; and increasing the value of P to expand the next endpoint box around a next larger hquad of the space filling curve until a size of the next endpoint box is maximized without exiting the range-query box and the space filling curve has not exited the range-query box to enable an interval of the space filling curve in the next endpoint boxes to be determined.

15. The article of manufacture of claim 13, further comprising computer readable program code capable of performing the operations of:

determining a next entry point of the space filling curve into the range-query box that occurs after the space filling curve exits the range-query box;

forming the first endpoint box to cover an hquad of the space filling curve at the entry point that is contained within the range-query box, wherein the endpoint box includes the P×P elements, with a first value selected as one;

increasing the value of P to expand the first endpoint box around a next larger hquad of the space filling curve until a size of the endpoint box is maximized without exiting the range-query box;

forming the next endpoint box having P×P elements, with the first value of P selected as one and the first element of the endpoint box that begins at the next element of the space filling curve, if the space filling curve has not exited the range-query box; and increasing the value of P to expand the next endpoint box around the next larger hquad of the space filling curve until a size of the endpoint box is maximized without exiting the range-query box and the space filling curve has not exited the range-query box to enable an interval of the space filling curve from the next entry point to an exit point to be determined.

16. The article of manufacture of claim 15, further comprising computer readable program code capable of performing the operation of determining a start address and a stop address for each interval of the space filling curve in the first and the next endpoint boxes.

17. The article of manufacture of claim 16, further comprising computer readable program code capable of performing the operation of accessing data on a computer readable storage medium having an address that corresponds to data from the start address to the stop address for each of the intervals of the space filling curve in the first and the next endpoint boxes.

18. The article of manufacture of claim 17, further comprising computer readable program code capable of performing the operation of accessing a portion of the data on a computer readable storage medium having an address that corresponds with data from the start address to the stop address for at least one interval of the space filling curve in the first and the next endpoint boxes.

19. The article of manufacture of claim 17, further comprising computer readable program code capable of performing the operation of dividing the interval of the space filling curve to form at least a first sub-interval and a second sub-interval and accessing data on a computer readable storage medium that corresponds to the addresses between the first and last addresses of the first and second sub intervals.

20. The article of manufacture of claim 13, wherein applying the space filling curve further comprises computer readable program code capable of performing the operations of applying a space filling curve selected from the group consisting of a z-order curve, a Hilbert curve, a Gosper curve, a Dragon curve, a Moore curve, and a Sierpiński curve.

* * * * *